United States Patent [19]
Vasudevan et al.

[11] Patent Number: 6,085,094
[45] Date of Patent: Jul. 4, 2000

[54] METHOD FOR OPTIMIZING SPECTRAL RE-USE

[75] Inventors: Mini Vasudevan, Dallas; Sheng-Chou Lin; Stone H. Tseng, both of Plano, all of Tex.

[73] Assignee: Nortel Networks Corporation, Canada

[21] Appl. No.: 09/141,477

[22] Filed: Aug. 27, 1998

Related U.S. Application Data

[60] Provisional application No. 60/057,596, Aug. 29, 1997.

[51] Int. Cl.$^7$ ..................................................... H04Q 7/36
[52] U.S. Cl. .......................... 455/447; 455/422; 455/446; 455/448; 455/449; 455/63; 455/296
[58] Field of Search ..................... 455/423, 422, 455/424, 443, 444, 446, 447, 448, 63, 67.3, 296, 67.1

[56] References Cited

U.S. PATENT DOCUMENTS

| | | | |
|---|---|---|---|
| 5,870,385 | 2/1997 | Ahmadi et al. | 455/447 |
| 5,946,625 | 10/1996 | Hassan et al. | 455/477 |
| 5,966,657 | 7/1997 | Sporre | 455/446 |
| 5,970,411 | 8/1997 | Faruque | 455/477 |
| 5,974,323 | 9/1996 | Doner | 455/447 |
| 5,974,324 | 2/1997 | Henson | 455/477 |

OTHER PUBLICATIONS

Lee, William C. Y., "Elements of Cellular Mobile Radio Systems," IEEE Transactions on Vehicular Technology, vol. 35, No. 2, pp. 48–56 (May 1986).

*Primary Examiner*—Fan Tsang
*Assistant Examiner*—Simon Nguyen
*Attorney, Agent, or Firm*—Carr & Storm, L.L.P.

[57] ABSTRACT

A method for optimizing spectral re-use between an interferer digital phase modulated cellular system and a desirable analog phase modulated cellular system is disclosed wherein an optimal guard band to use with adjacent channel interference is determined, or an optimal guard zone to use with co-channel interference is determined. This is achieved by determining the effect of interference due to a digital phase modulated signal at the baseband of a desired analog phase modulated signal. By the use of this invention, the capacity of a desired system and/or the quality of a service provided by a desired system may be enhanced.

12 Claims, 6 Drawing Sheets

SPECTRUM OVERLAY

SPECTRUM NON-OVERLAY

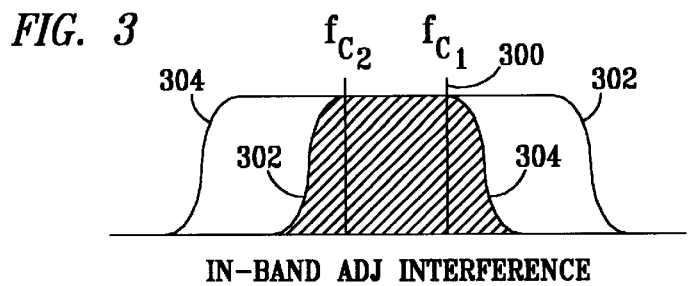
FIG. 3 IN-BAND ADJ INTERFERENCE
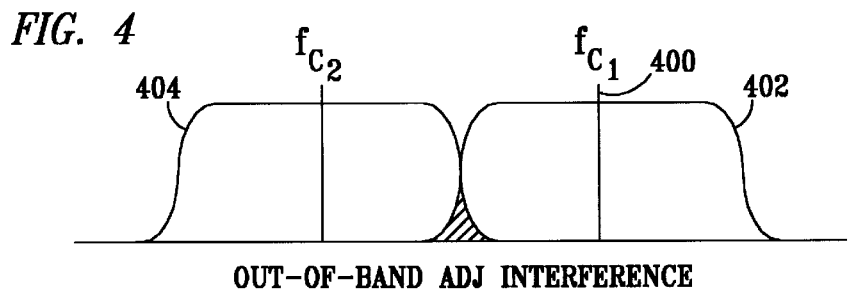
FIG. 4 OUT-OF-BAND ADJ INTERFERENCE
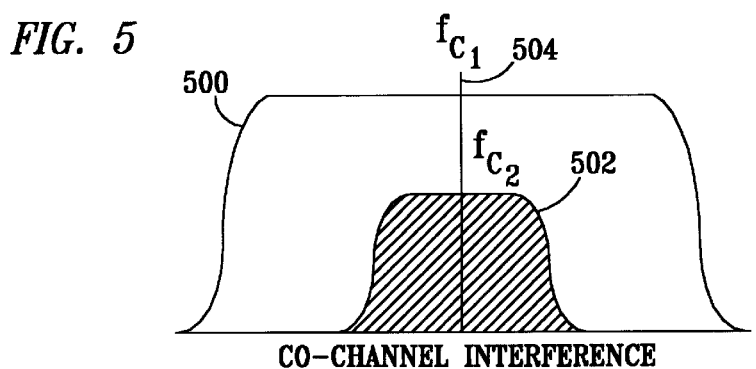
FIG. 5 CO-CHANNEL INTERFERENCE
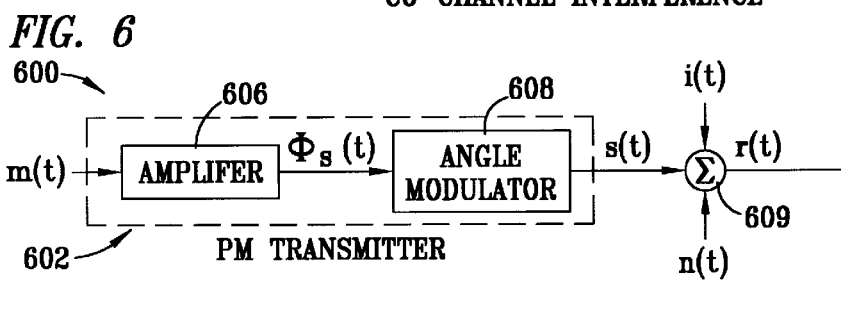
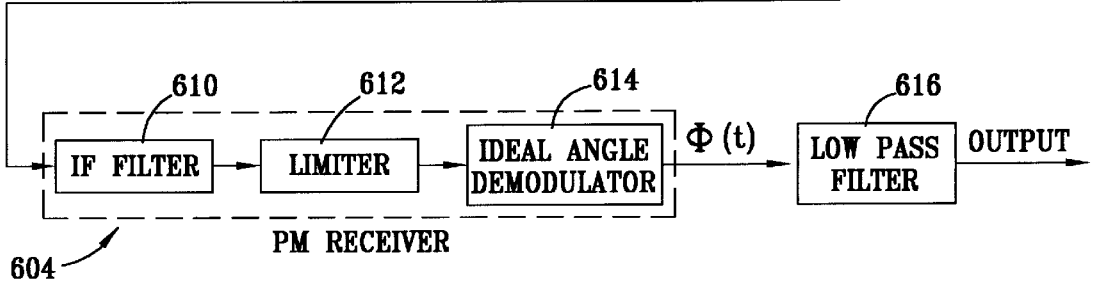
FIG. 6

METHOD FOR OPTIMIZING SPECTRAL RE-USE

CLAIM OF PRIORITY

This application claims priority from U.S. Provisional Patent Application No. 60/057,596 of Mini Vasudevan, et al, entitled "Interference Effects of Digitally Modulated Signals on Analog Phase Modulated Systems" filed Aug. 29, 1997.

TECHNICAL FIELD OF THE INVENTION

The invention relates generally to radio communications and, more particularly, to a method for optimizing spectral re-use for radio communications.

BACKGROUND OF THE INVENTION

The advent of Personal Communication Services (PCS) has resulted in a tremendous increase in the demand for spectrum. To meet this demand, different service providers might have to share the scarce spectrum allocated, necessitating several different access schemes employing different modulation techniques to co-exist. Since optimum spectral re-use is of primary concern, estimation of both co-channel and adjacent channel (i.e., "interchannel") interference from interferers in the same system (due to frequency re-use) as well as from other systems and services sharing the same band is very important. While the effects of adjacent channel interference can be mitigated by good filter design and good frequency planning techniques, co-channel interference remains as a limiting factor for systems sharing the same band. Additionally, the interference between co-existing networks is a source of regulatory problems.

One particular type of interference which is becoming more prevalent is interference on systems which use analog (e.g., phase modulated (PM)) signals by systems which use digital (e.g., QPSK or MSK) signals. This type of interference is becoming more prevalent because, while the majority of present systems are analog, users are switching to digital systems because they are less prone to noise, they provide greater security against eavesdropping and theft of services, they permit cell phones to be smaller, lighter, and require less battery power than analog cell phones, and they provide services such as e-mail and headline news which are not available with analog systems. It can be appreciated, therefore, that techniques for optimizing spectrum efficiency with respect to digital signals are becoming increasingly important due to the expected scarcity in the bandwidth available for wireless communication systems. Spectrum-sharing enhances both the spectral utilization and the flexibility of that utilization and, as a result, provides additional capacity to networks. However, to obtain optimal spectral re-use, channel allocation and channel spacing of co-existing systems must be coordinated.

The effects of interchannel interference on analog signals by digital signals are, however, different from the effects on analog signals by analog signals and are not well known in the prior art. Because the precise interference effects of digital signals on analog signals is not well known, the spectral re-use with respect to digital signals can not be optimized using conventional techniques.

Therefore, what is needed is a method for analyzing the interchannel interference effects of digital signals on analog signals and, furthermore, for utilizing such analysis to coordinate channel allocation and channel spacing of co-existing systems so that spectral re-use may be optimized when digital signals interfere with analog signals, and so that network capacity may be enhanced.

SUMMARY OF THE INVENTION

According to the present invention, spectral re-use is optimized by determining an optimal guard band to use with adjacent channel interference, or by determining an optimal guard zone to use with co-channel interference. This is achieved by determining the effect of interference due to a digital phase modulated signal at the baseband of a desired analog phase modulated signal. By the use of this invention, the capacity of a desired system and/or the quality of a service provided by a desired system may be enhanced.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a chart showing, in the frequency domain, adjacent channel interference which is in-band.

FIG. 4 is a chart showing, in the frequency domain, adjacent channel interference which is out-of-band.

FIG. 5 is a chart showing, in the frequency domain, co-channel interference.

FIG. 6 is a block diagram showing an analog phase modulated system.

DETAILED DESCRIPTION OF THE INVENTION

Figure 1:
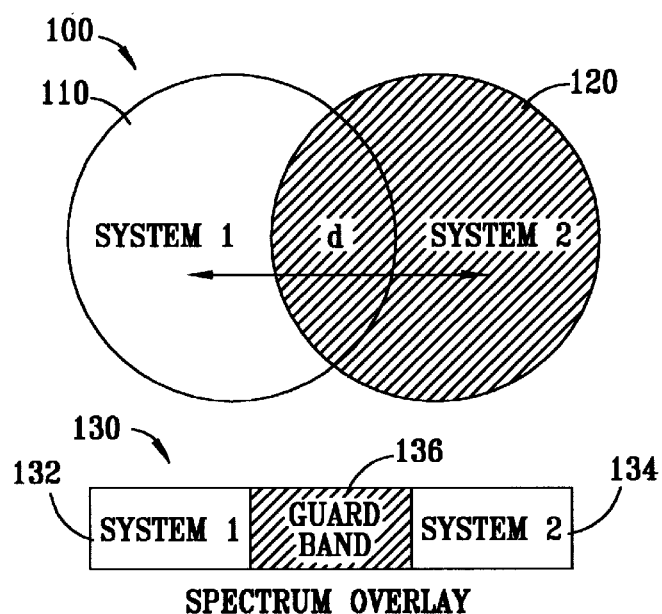
FIG. 1 is a schematic diagram of two systems which coexist in one area.
Figure 2:
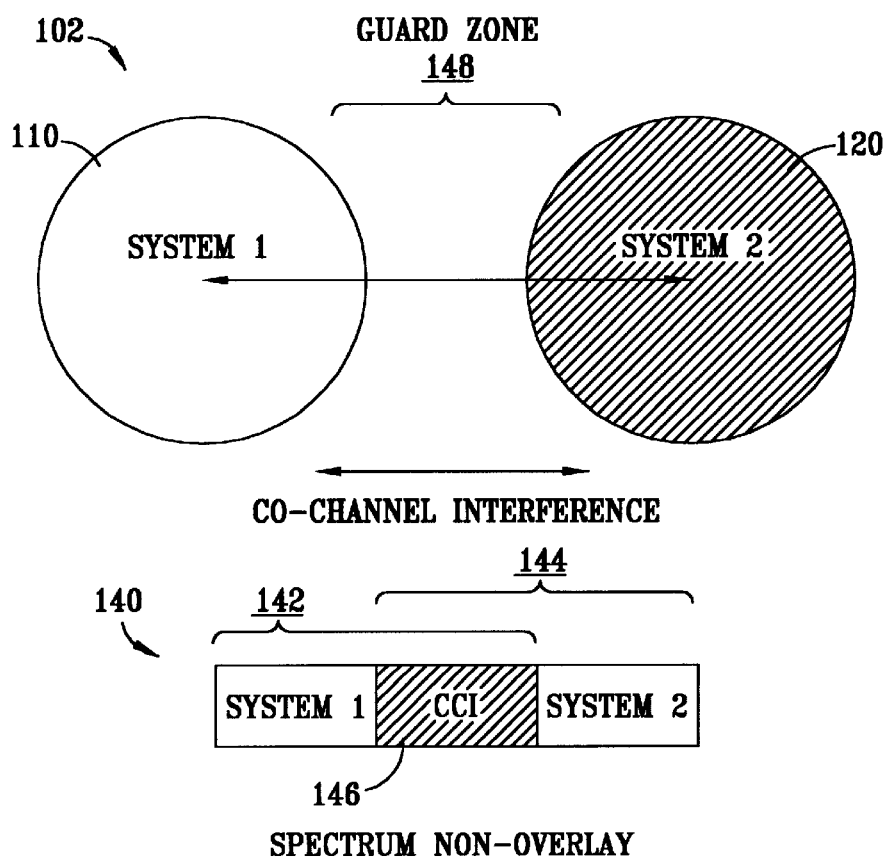
FIG. 2 is a schematic diagram of two systems which coexist in adjacent areas.

Referring to FIGS. 1 and 2, the reference numerals 100 and 102, respectively, generally designate first and second areas, each of which have two coexisting cellular systems 110 and 120, such as cellular base stations or any fixed stations. The systems 110 and 120 may use different modulation schemes, occupy different bandwidths, have different propagation characteristics, and/or have different access schemes.

The systems 110 and 120 are shown in FIG. 1 as coexisting in one area (i.e., have coverage overlay) resulting primarily in adjacent channel interference (ACI). Also shown in FIG. 1 is a frequency spectrum overlay 130 which depicts, in a frequency domain, a band 132 of frequency channels used by the system 110 and a band 134 of frequency channels used by the system 120. A guard band 136 comprising a band of unused frequencies separating the bands 132 and 134, is provided to minimize interference between the two systems 110 and 120.

ACI may be classified as either "in-band" or "out-of-band". In-band ACI is illustrated in FIG. 3, wherein a center 300 of an interfering signal bandwidth 302 falls within a bandwidth 304 of a desired signal. Out-of-band ACI is illustrated in FIG. 4, wherein a center 400 of an interfering signal bandwidth 402 falls outside of a bandwidth 404 of a desired signal.

Referring back to FIG. 2, the systems 110 and 120 are shown there as coexisting in adjacent overlays (i.e., have coverage non-overlay) resulting primarily in co-channel interference (CCI). Also shown in FIG. 2 is a frequency spectrum overlay 140 which depicts, in a frequency domain, a band 142 of frequency channels used by the system 110, and a band 144 of frequency channels used by the system 120. The bands 142 and 144 overlap each other in a CCI band 146 in which some frequency channels are re-used by both of the systems 110 and 120. As a result of the CCI band 146, a guard zone 148 defining a geographical distance between the systems 110 and 120 is established to minimize interference between the two systems 110 and 120 in the CCI band 146.

FIG. 5 graphically depicts CCI, which is the dominant interference in frequency re-use systems arranged as the system 110 and 120 are in FIG. 2. As shown in FIG. 5, with CCI, a desired signal 500 and an interfering signal 502 make use of the same carrier frequency 504.

FIG. 6 illustrates a conventional analog phase modulated (PM) system 600 which is often "victimized" by ACI and CCI from digital systems. The PM system 600 comprises a PM transmitter 602, such as a cellular base station, and a PM receiver 604, such as a cell phone within the coverage of the PM transmitter 602. The PM transmitter 602 includes an amplifier 606 configured for receiving and amplifying an input baseband signal m(t) and passing an amplified signal $\Phi_s(t)$ to an angle modulator 608. The modulator 608 is configured for outputting a modulated carrier signal s(t) to an antenna (not shown) for transmission to the PM receiver 604. The signal s(t) is degraded into a signal r(t) by interference i(t) and noise n(t) received symbolically at a summer 609. The PM receiver 604 includes an intermediate frequency (IF) filter 610 configured for receiving and filtering the degraded signal r(t), and is connected for passing a filtered signal to a limiter 612. The limiter 612 is configured to pass an amplitude limited signal to an ideal angle demodulator 614 which demodulates the signal. The demodulator 614 is connected for passing the demodulated signal to a low pass filter 616 configured to filter out noise and undesirable frequencies and to output the baseband signal m(t) (with added interference and noise) for use, such as by a telephone receiver (not shown). Because analog phase modulated systems such as the system 600, and the operation of such systems, are well known to those skilled in the art, they will not be described in further detail herein.

For the purpose of illustration, it will be assumed that the system 110 (FIGS. 1–2) is an analog phase modulated system such as the system 600 (FIG. 6), and that the system 120 (FIGS. 1–2) is a digital system that generates ACI (FIG. 1) or CCI (FIG. 2) which interferes with the system 110. Then, to determine the optimal guard band 136 (FIG. 1), the optimal guard zone 148 (FIG. 2), or the optimal capacity of the systems 110 and 120, the effect of digital interference i(t) (ACI or CCI, respectively), on the baseband signal m(t) output by the PM receiver 604 of the system 110 must be determined. Noise n(t) may be neglected in determining the optimal guard band and optimal guard zone because the signal is limited much more by interference than by noise.

In accordance with a method of the present invention, closed form expressions for the baseband interference spectra are determined as a function of the RF carrier-to-interference (CIR) ratio, which can be translated into the co-channel re-use ratio. System performance is determined by the baseband signal-to-interference (SIR) ratio. From the interference spectral density, the baseband SIR at a spot frequency, where the interference is a maximum or the SIR is minimum, is determined.

Figure 7:
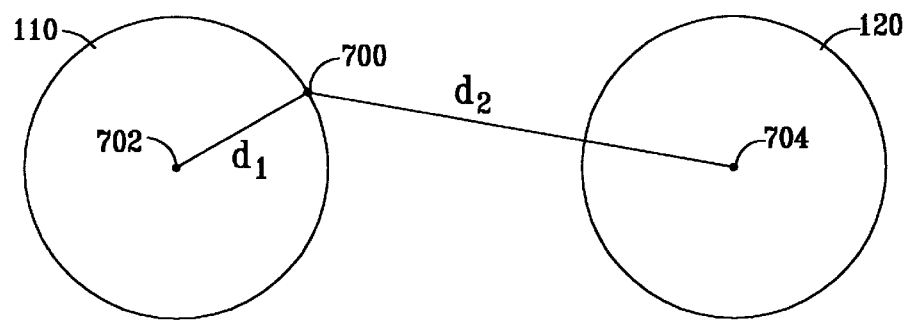
FIG. 7 is a schematic diagram showing a link between two systems.

The method the present invention may be more clearly understood with reference to FIG. 7, which illustrates the cellular systems 110 and 120 as coexistent in adjacent areas (i.e., coverage non-overlay), as was shown in FIG. 2. As shown in FIG. 7, two distances $d_1$ and $d_2$ are depicted. The distance $d_1$ represents a worst case distance from a mobile unit 700 to a transmitter 702 centrally located within the system 110, depicted herein as a desired system. The distance $d_2$ represents a distance from the mobile unit 700 to a transmitter 704 centrally located within the system 120, depicted herein as an interferer system. For the sake of example, the interference reduction factors—

$$IRF = \frac{\text{Signal Spectral Density}}{\text{Maximum Interference Spectrum Density}} = \frac{\Phi_s^2 / 2W}{S_\lambda(0) / R^2},$$

are calculated for different modulation techniques which may be used, as discussed below with respect to Equations 19–21 and Tables 2–4, for a bandwidth of 30 kHz, and for an interference to signal carrier power ratio of $R^2=0.01$ (corresponding to a carrier to interference ratio (CIR) of 20 dB), when both signal and interference are non-fading. The IRF values for CCI are summarily tabulated as follows:

TABLE 1

IRF VALUES

| Modulation | IRF |
|---|---|
| Phase Modulation (PM) | 6.83 dB |
| Quadrature Phase Shift Keying (QPSK) | 9.31 dB |
| Minimum Shift Keying (MSK) | 10.14 dB |

In accordance with the present invention, the signal to interference ratio, SIR, at the baseband may be computed as the sum of CIR and IRF. Accordingly, if an SIR of 30 dB is acceptable, then to achieve such SIR, the required CIR resulting from CCI for each type of modulation would be calculated as follows:

SIR−IRF=CIR

For PM: 30 dB−6.83 dB=23.17 dB

For QPSK: 30 dB−9.31 dB=20.69 dB

For MSK: 30 dB−10.14 dB 19.86 dB

It is well known that:

$$CIR = \frac{C}{I} = \left(\frac{d_2}{d_1}\right)^\gamma$$

The value for γ is generally between 2 and 6, and will be considered to be 4 for this example. Accordingly, for the different modulation techniques:

For PM: $CIR = 23.17 \text{ dB} = 207.5 = \left(\frac{d_2}{d_1}\right)^4$, $\frac{d_2}{d_1} = 3.80$ For QPSK: $CIR = 20.69 \text{ dB} = 117.2 = \left(\frac{d_2}{d_1}\right)^4$, $\frac{d_2}{d_1} = 3.29$ For MSK: $CIR = 19.86 \text{ dB} = 96.8 = \left(\frac{d_2}{d_1}\right)^4$, $\frac{d_2}{d_1} = 3.14$ Given $d_1$, it is then a straightforward algebraic problem to calculate $d_2$ and the guard zone 148 (FIG. 2), and may be solved in a manner well known to those skilled in the art.

Alternatively, the guard band 136 (FIG. 1) for ACI may be calculated given an SIR of, for example, 50 dB, and by calculating the IRF from Equations 15–18, as discussed below. The carrier to adjacent channel interference ratio may then be calculated as the CIR was calculated above, i.e., as the difference between the SIR and the calculated IRF. The guard band 136 may then be determined from the carrier to adjacent channel interference ratio using techniques which are well known to those skilled in the art, and will, therefore, not be discussed in further detail.

Alternatively, if $d_1$ and $d_2$ are both given, then an improvement in the quality of service, reflected in the SIR, would be gained by switching from PM to QPSK or MSK modulation techniques. The improvement gained by switching to QPSK would be 2.48 dB (9.31–6.83), and by switching to MSK would be 3.31 dB (10.14–6.83). Alternatively, for an acceptable baseband performance, a switch from PM to a digital modulation such as QPSK or MSK would permit frequencies to be used closer together, which would permit the number of subscribers per channel for a given area to be increased. In still another alternative, a smaller re-use distance ratio $d_2/d_1$ corresponds to a smaller number N of cells per cluster according to the well known equation:

$$\frac{d_2}{d_1} = \sqrt{3N}$$

Thus, more channels per cell may be used by switching from PM to either QPSK or MSK, resulting in a higher capacity for the system since the total number of available channels in the system is generally fixed.

The following describes how the values for the IRFs used in the foregoing equations are determined.

The general methodology for evaluating the baseband interchannel interference when two angle modulated waves interfere with each other has been considered by V. K. Prabhu and L. H. Enloe in "Interchannel Interference Considerations in Angle-Modulated Systems," *The Bell System Technical Journal*, pp. 2333–57, September 1969. An ideal angle demodulator is assumed in the system. This method is extended to the case of a digital interferer to an analog desired signal for calculating the baseband interchannel interference. The digital interferer is an MSK/QPSK system modulated by a binary sequence $\{a_k\}$ taking values ±1, and the analog desired signal is phase modulated by band limited white gaussian random process. It is assumed that there is only one interfering wave corrupting the desired signal. The effect of linear filters is not considered. Let the analog phase modulated wave be represented as $s(t) = A\cos(2\pi f_c t + \Phi_s(t))$ where $f_c$ is the carrier frequency and $\Phi_s(t)$ is the phase modulation of the desired signal.

MSK Interferer

The interfering MSK signal is represented as an angle modulated signal by $$i(t) = AR\cos\left[2\pi\left\{(f_c + f_d)t + h\sum_k a_k \int_0^t \text{rect}\left(\frac{t-kT}{T}\right)dt\right\} + \mu\right] \quad (1)$$

where $$\Phi_i(t) = 2\pi h \sum_k a_k \int_0^t \text{rect}\left(\frac{t-kT}{T}\right)dt \quad (2)$$

is the phase modulation of the interfering signal. MSK is a special form of binary Continuous Phase Frequency Shift Keying (CPFSK) in which h=1/4T and is detected as a phase modulated signal. AR is the amplitude of the MSK signal, R being the relative amplitude of the interfering wave with respect to the desired wave. The CIR at RF is therefore given by $1/R^2$. $f_d$ is the difference between the carrier frequency of the interfering signal and that of the desired signal. For co-channel interference, $f_d$ is usually very small. $\mu$ is the random phase offset between the desired and interfering signals. The probability density function of $\mu$ is uniform and given by $$f_\mu(\mu) = \begin{cases} \frac{1}{2\pi} & 0 \le \mu \le 2\pi \\ 0 & \text{otherwise} \end{cases} \quad (3)$$

$$\sum_k a_k$$

is the binary sequence taking values ±1. T is the baud interval and rect[.] is the rectangular pulse given by $$\text{rect}(x) = \begin{cases} 1 & 0 \le x \le T \\ 0 & \text{otherwise} \end{cases} \quad (4)$$

When detected as a phase modulated signal, at odd multiples of T, the phase that is measured (modulo 2π) will take values ±π/2 and at even multiples of T it can take values 0 and π.

MSK may be represented as a form of four phase PSK. The equivalent low pass digitally modulated signal may be represented in the form $$v(t) = \sum_n a_{2n} g(t - 2nT) - j\sum_n a_{2n+1} g(t - 2nT - T) \quad (5)$$

where $$g(t) = \begin{pmatrix} \sin\left(\frac{\pi t}{2T}\right) & 0 \le t \le 2T \\ 0 & \text{otherwise} \end{pmatrix} \quad (6)$$

Thus, this type of signal is viewed as a four phase PSK signal in which the pulse shape is one-half of a sinusoid. The even numbered binary valued ±1 symbols $\{a_{2n}\}$ of the information sequence $\{a_n\}$ are transmitted via the cosine of the carrier while the odd numbered symbols $\{a_{2n+1}\}$ are transmitted via the sine of the carrier. The transmission on the two orthogonal carrier components is 1/2T bits per second so that the combined transmission rate is 1/T bits per second. The bit transitions on the sine and cosine carrier components are staggered or offset in time by T seconds. Therefore, MSK can be represented as $$AR\left[\left\{\sum_n a_{2n}g(t-2nT)\right\}\cos[2\pi(f_c+f_d)t+\mu] - \left\{\sum_n a_{2n+1}g(t-2nT-T)\right\}\sin[2\pi(f_c+f_d)t+\mu]\right] \quad (7)$$

equivalent to two staggered quadrature modulated binary PSK signals so that the corresponding sum of the two quadrature signals is a constant envelope frequency modulated signal.

QPSK Interferer

The interfering QPSK signal is given by $$i(t) = AR\cos\left[2\pi(f_c+f_d)t + \sum_n a_n g(t-nT) + \mu\right],$$

where $$\Phi_i(t) = \sum_n a_n g(t-nT)$$

is the phase modulation of the interfering signal. This is represented as two quadrature modulated binary PSK signals by the equivalent amplitude modulation representation $$AR\left[\left\{\sum_n a_{2n}\text{rect}\left(\frac{t-kT}{T}\right)\right\}\cos[2\pi(f_c+f_d)t+\mu] - \left\{\sum_n a_{2n+1}\text{rect}\left(\frac{t-kT}{T}\right)\right\}\sin[2\pi(f_c+f_d)t+\mu]\right] \quad (8)$$

The shaping pulse in the amplitude modulation representation is rect[.] as in Equation 4.

Evaluation of the Base band Interference Spectra

The composite voltage into the ideal angle demodulator is r(t)=s(t)+i(t) given by $$Re[(e^{j\Phi_s(t)}+Re^{j(2\pi f_d t+\Phi_i(t)+\mu)})e^{j2\pi f_c t}]=Re[e^{j\Phi_s(t)}(1+Re^{j(2\pi f_d t+\Phi_i(t)-\Phi_s(t)+\mu)})e^{j2\pi f_c t}] \quad (9)$$

where the amplitude A is normalized to unity and Re[.] denotes the real part. The phase of this composite signal into the phase demodulator relative to the carrier frequency $f_c$ is given by $$Im[\ln(s(t)+i(t))]=\Phi_s(t)+Im[\ln(1+Re^{j(2\pi f_d t+\Phi_i(t)-\Phi_s(t)+\mu)})] \quad (10)$$

where Im[.] is the imaginary part. Equivalently, $$\Phi_s(t)+\sum_{k=1}^{\infty}\frac{R^k}{k}(-1)^{k+1}\sin[k(2\pi f_d t+\Phi_i(t)-\Phi_s(t)+\mu]$$

is the composite phase when R<1. $\Phi_s(t)$ is the ideal desired phase and the summation term, denoted as $\lambda(t)$, corresponds to the phase noise appearing at the detector due to the interference. To determine the effect of this phase noise, its spectrum needs to be determined. The autocorrelation function of $\lambda(t)$ is given by $$R_\lambda(\tau)=E[\lambda(t)\lambda(t+\tau)] \quad (11)$$

where E[.] denotes expectation. The random phase angle $\mu$ makes the complex random process wide sense stationary, and $R_\lambda(t)$ can be shown to be $$R_\lambda(\tau) = \quad (12)$$

$$E\left\{\frac{1}{2}\sum_{k=1}^{\infty}\frac{R^{2k}}{k^2}\cos[k(2\pi f_d\tau+\Phi_i(t+\tau)-\Phi_i(t)-\Phi_s(t+\tau)+\Phi_s(t))]\right\}$$

when R<1. The above may be expanded as $$R_\lambda(\tau) = \quad (13)$$

$$E\left\{\frac{1}{2}\sum_{k=1}^{\infty}\frac{R^{2k}}{k^2}\cos[2\pi k f_d\tau]\cdot Re[e^{-j[k(\Phi_i(t)-\Phi_i(t+\tau))]}e^{j[k(\Phi_s(t)-\Phi_s(t+\tau))]}]\right\}$$

Here, $\Phi_i(t)$ and $\Phi_s(t)$ are statistically independent and hence, the complex processes $e^{j\Phi_i(t)}$ and $e^{j\Phi_s(t)}$ are also statistically independent. The autocorrelation function of a complex base band phase modulated process $v(t)=e^{j\Phi(t)}$ is given by the Wiener-Khintchine theorem as $$R_v(\tau)=E[v(t)v^*(t+\tau)]=E[e^{j(\Phi(t)-\Phi(t+\tau))}]. \quad (14)$$

Hence the $k^{th}$ term of $R_\lambda(t)$ is given by $$R_{\lambda k}(\tau) = \frac{R^{2k}}{2k^2}\cos[2\pi k f_d\tau]R_{v_{ik}}(\tau)R_{v_{sk}}(\tau) \quad (15)$$

where $R_{v_{ik}}(\tau)$ and $R_{v_{sk}}(\tau)$ are the autocorrelation functions of the processes $v_{ik}(t)=e^{jk\Phi_i(t)}$ and $v_{sk}(t)=e^{jk\Phi_s(t)}$. For high CIR, R<<1. In this case, only the first term of $R_\lambda(\tau)$ gives significant contribution. Therefore, $R_\lambda(\tau)=R_{\lambda 1}(\tau)$ for (k=1). Therefore, $R_\lambda(\tau)$ is given by $$R_\lambda(\tau) = \frac{R^2}{2}\cos[2\pi f_d\tau]R_{v_i}(\tau)R_{v_s}(\tau) \quad (16)$$

The power spectral density $S_\lambda(f)$ of the random phase angle $\lambda$ is given by the Fourier transform of $R_\lambda(\tau)$ $$S_\lambda(f) = \frac{1}{2}\sum_{k=1}^{\infty}\frac{R^{2k}}{k^2}S_{vk}(f) \quad (17)$$

where $S_{v_k}(f)$ is given by $$\int_{-\infty}^{+\infty} e^{-j[k(\Phi_s(t)-\Phi_i(t+\tau))]} e^{j[k(\Phi_x(t)-\Phi_s(t+\tau))]} e^{-jk2\pi f_d \tau} e^{-j2\pi f\tau} d\tau \quad (18)$$

For $R<<1$, $S_\lambda(f)$ is given by $(R^2/2)S_{v1}(f)$. For co-channel interference, $f_d=0$. Hence $$R_\lambda(\tau) = \frac{R^2}{2} R_{v_i}(\tau) R_{v_s}(\tau) \quad (19)$$

which is $R^2/2$ times the product of the autocorrelation functions of the base band phase modulation processes $e^{j\Phi_i(t)}$ and $e^{j\Phi_s(t)}$. Therefore, $S_\lambda(f)$ is given by $$S_\lambda(f) = \frac{R^2}{2} \int_{-\infty}^{\infty} R_{v_i}(\tau) R_{v_s}(\tau) e^{-j2\pi f\tau} d\tau \quad (20)$$

Equivalently, $S_\lambda(f)$ may be written as $$S_\lambda(f) = \frac{R^2}{2}[S_{v_i}(f) \otimes S_{v_s}(f)] \quad (21)$$

where, $S_{v_i}(f)$ and $S_{v_s}(f)$ are the spectral densities of the base band processes $e^{j\Phi_i(t)}$ and $e^{j\Phi_s(t)}$ respectively and $\otimes$ denotes the convolution operation. Hence to determine the spectral density of the co-channel interference at base band, the convolution of the base band spectral densities of the desired and interfering signals must be evaluated.

Power Spectral Density of a PM Analog Signal

A sinusoidal wave of constant amplitude phase modulated by a signal $m(t)$ may be written as $s(t)=A\cos(w_c t+k_p m(t)+\theta)$, where A is the amplitude of the wave, $f_c=w_c/2\pi$ is the carrier frequency of the wave, $\theta$ is the random phase associated with the wave which has a probability density $$f_\theta(\theta) = \begin{cases} \frac{1}{2\pi} & 0 \leq \theta \leq 2\pi \\ 0 & \text{otherwise} \end{cases} \quad (22)$$

and $k_p$ is the modulation index. $\Phi_s(t)=k_p m(t)$ is the phase modulation of $s(t)$. Here, $m(t)$ is a random voice signal having bandwidth W approximately 4 kHz. $m(t)$ is modeled by a stationary band limited Gaussian random process with mean 0 and variance $\sigma^2$. The average spectral density of $m(t)$, $S_m(f)$ is given by the Fourier transform of the autocorrelation function $$R_m(\tau) = E[m(t)m(t+\tau)] = \sigma^2 \frac{\sin 2\pi W\tau}{2\pi W\tau}$$

as $$S_m(f) = \begin{cases} \frac{\sigma^2}{2W} & |f| < W \\ 0 & \text{otherwise} \end{cases} \quad (23)$$

$R_m(0)$ is given by $E[m^2(t)]=\sigma^2$ which is the power in the voice signal. The phase modulated signal $s(t)$ can be shown to be wide sense stationary and can be written as $$s(t)=ARe[e^{j(2\pi f_c t+k_p m(t)+\theta)}].$$

The complex base band phase modulated process of $s(t)$ is given by $v_s(t)=e^{jk_p m(t)}$ and the autocorrelation function of $v_s(t)$ is given by $$R_{v_s}(\tau)=E[v_s(t)v_s^*(t+\tau)]=E[e^{jk_p(m(t)-m(t+\tau))}]. \quad (24)$$

Since $m(t)$ is Gaussian, $R_{v_s}(\tau)=e^{-k_p^2(R_m(0)-R_m(\tau))}$. The spectral density of $v_s(t)$ is hence given by $$S_{v_s}(f) = \int_{-\infty}^{\infty} e^{-k_p^2(R_m(0)-R_m(\tau))} e^{-j2\pi f\tau} d\tau. \quad (25)$$

Now the autocorrelation function of the angle modulated signal $s(t)$ can be written as $$R_s(\tau) = \frac{A^2}{2} e^{-k_p^2(R_m(0)-R_m(\tau))} \cos(2\pi f_c \tau) \quad (26)$$

and the spectral density is given by $$S_s(f) = \int_{-\infty}^{\infty} R_s(\tau) e^{-j2\pi f\tau} d\tau.$$

$S_s(f)$ can be expressed in terms of the spectral density of the base band process $S_{v_s}(f)$ as $(A^2/4)[S_{v_s}(f-f_c)+S_{v_s}(f+f_c)]$. Therefore, to evaluate the spectral density of the modulated signal $s(t)$, $S_{v_s}(f)$ must be determined. For low index modulation (i.e. for $k_p>>1$), the approximation for $R_{v_s}(\tau)$ may be made as $$R_{v_s}(\tau)=e^{-k_p 2R_m(0)} e^{k_p 2R_m(\tau)} \cong e^{-k_p 2R_m(0)}[1+k_p^2 R_m(\tau)] \quad (27)$$

The spectral density $S_{v_s}(f)$ is therefore given by $$S_{v_s}(f) = e^{-k_p^2 R_m(0)} \delta(f) + e^{-k_p^2 R_m(0)} k_p^2 \int_{-\infty}^{\infty} R_m(\tau) e^{-j2\pi f\tau} d\tau \quad (28)$$

for this case. The first part corresponds to the carrier component of the spectrum and the second part corresponds to the first order side band component. The modulation index $k_p$ is considered low, if $k_p<0.1$ radian. If $k_p<1.5$ radian, it is considered high-index and if $0.1<k_p<1.5$, it is considered medium index. When $k_p$ is medium or high indexed, the series expansion must be used as $$R_{v_s}(\tau) = e^{-k_p^2 R_m(0)} e^{k_p^2 R_m(\tau)} = e^{-k_p^2 R_m(0)} \left[\sum_{n=0}^{\infty} \frac{(k_p^2 R_m(\tau))^n}{n!}\right] \quad (29)$$

This series expansion is called Lewart's expansion. If the spectral density of $m(t)$ is known, the spectral density of $k_p^{2n} R_m^n(\tau)$ can, in principle, be calculated as the n fold convolution of the spectral density of $k_p^2 R_m(\tau)$ with itself. For a mean square modulation index $\Phi_s^2$ for the phase modulation $\Phi_s(t)=k_p m(t)$, $$k_p^2 R_m(\tau) = \Phi_s^2 \frac{\sin 2\pi W\tau}{2\pi W\tau}$$

such that the spectral density of $\Phi_s(t)$ denoted by $S_{\Phi_s}(f)$ is given by $$S_{\Phi_s}(f) = \frac{\Phi_s^2}{2W} \quad (30)$$

Thus the spectral density of medium index phase modulated signal can be determined using Lewart's formula and the n-fold convolution theorem.

If the rms modulation $\Phi_s$ index exceeds 2 radians ($\Phi_s$>2.0 radians) the number of convolutions required will be very large. However, for small modulation index, as well as for large index, far down on the tails, the number of terms to be included in the series is very large. In such cases, the spectrum may be calculated using the saddle point method disclosed by V. K. Prabhu and H. E. Rowe, "Special Density Bounds of a PM Wave," *The Bell System Technical Journal*, pp. 769–811, March 1969. As long as the modulation index is even moderately high ($\Phi_s^2$>10) the spectrum can be estimated by the saddle point method for all values of f in a simple manner with a fractional error of less than 10%.

Power Spectral Density of MSK/QPSK Signals

For a digital signal, the spectral density is a function of the spectral characteristics of the shaping pulse and the baud rate T. The base band rate of MSK and QPSK signals can be determined from the amplitude modulated representation of these signals (Eq. 7, Eq. 8).

MSK Signal

The spectral density of base band MSK signal $v_i(t)=e^{j\Phi_i(t)}$ can be estimated from the amplitude modulation representation of Eq. 7. The spectral density is given by $$S_{v_i}(f) = \frac{\sigma_a^2}{T}|G(f)|^2 \quad (31)$$

where G(f) if the Fourier transform of the signaling pulse $$g(t) = \sin\frac{\pi t}{2T} \quad (Eq.\ 6).$$

Therefore $S_{v_i}(f)$ is given by $$S_{v_i}(f) = \frac{16T(\cos(2\pi fT))^2}{\pi^2(1 - 16f^2T^2)^2} \quad (32)$$

QPSK Signal

The spectral density of base band QPSK signal $v_i(t)=e^{j\Phi_i(t)}$ can be estimated from the amplitude modulation representation of Eq. 8. The spectral density is given by $$S_{v_i}(f) = \frac{\sigma_a^2}{T}|P(f)|^2 \quad (33)$$

where P(f) is the Fourier transform of the rectangular signaling pulse. $S_{v_i}(f)$ therefore is given by $$S_{v_i}(f) = \frac{T(\sin(\pi fT))^2}{(\pi fT)^2} \quad (34)$$

In MSK, the base band waveform that multiples the quadrature carrier is much smoother than the abrupt rectangular waveform of QPSK. The waveform of MSK exhibits phase continuity whereas that of QPSK is discontinuous. MSK has a main center lobe which is 1.5 times as wide as the main lobe of QPSK; but the side lobes fall off much faster. Hence the fractional out of band power for MSK is less compared to QPSK, accounting for the higher bandwidth efficiency of MSK.

The convolution of the base band spectrum of the desired signal $S_{v_s}(f)$ with that of the interfering signal $S_{v_i}(f)$ gives the base band interference spectrum $S_\lambda(f)$ as given by Eq. 21 for high CIR ($R^2$<<1). The baseband output due to interference can therefore be computed as a function of the interference to carrier ration $R^2$, the mean square modulation index $\Phi_s^2$ of the PM signal, and the baud rate T of the digital interferer, assuming $f_d$=0. It is seen that the ratio of interference power density to signal power density is maximum at the lowest base band frequency. However, for narrow band signals, the baseband interference spectrum is quite flat in the range |f|<W. Hence the ratio of total signal to total interference in the baseband width W is approximately equal to that at the lowest base band frequency.

Co-channel Interference Spectral Density under Non-fading Conditions

Under non-fading conditions, the RF interference-to-signal ratio $R^2$ is a fixed quantity. For high average CIR, therefore $R^2$<1. The minimum base band SIR relative to CIR is computed as $$SIR_{min} = \frac{\Phi_s^2/2W}{S_\lambda(0)/R^2} \quad (35)$$

where $S_\lambda(0)$ is the interference power spectral density at the lowest base band frequency. This gives the improvement in base band SIR relative to $R^2$. Hence the total SIR at the lowest base band frequency is given by CIR+$SIR_{min}$.

Figure 8:
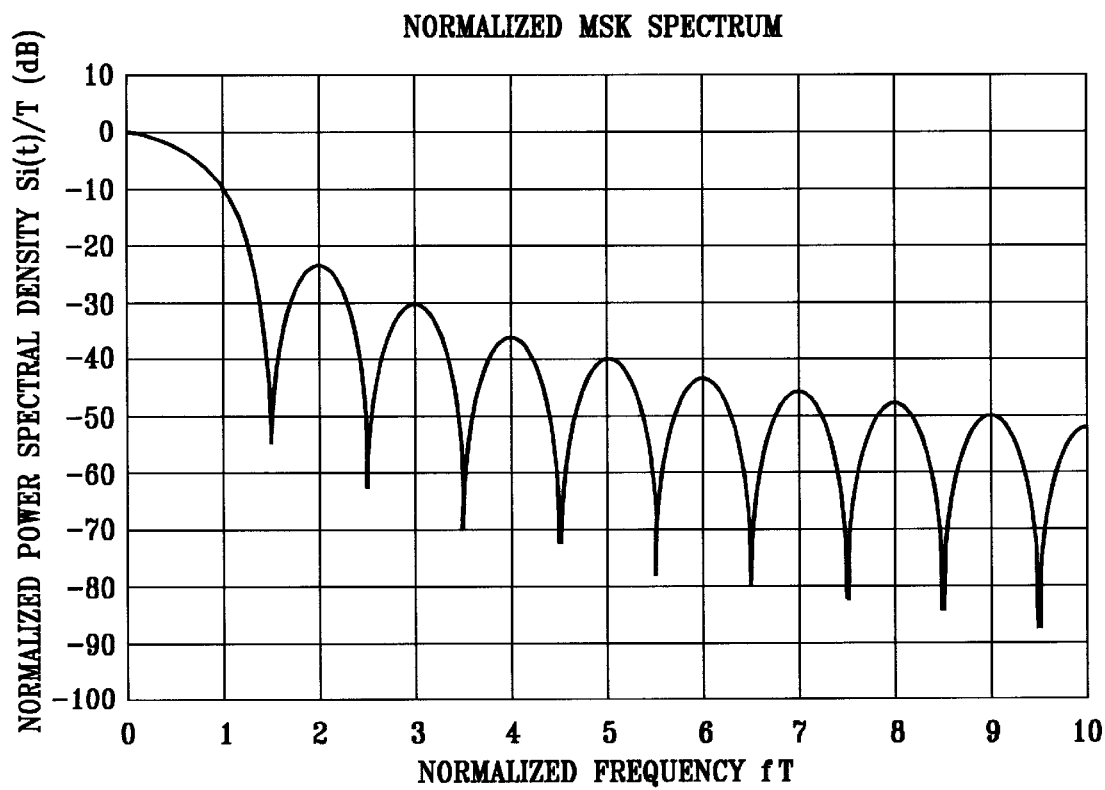
FIG. 8 is a chart illustrating a normalized MSK spectrum.
Figure 9:
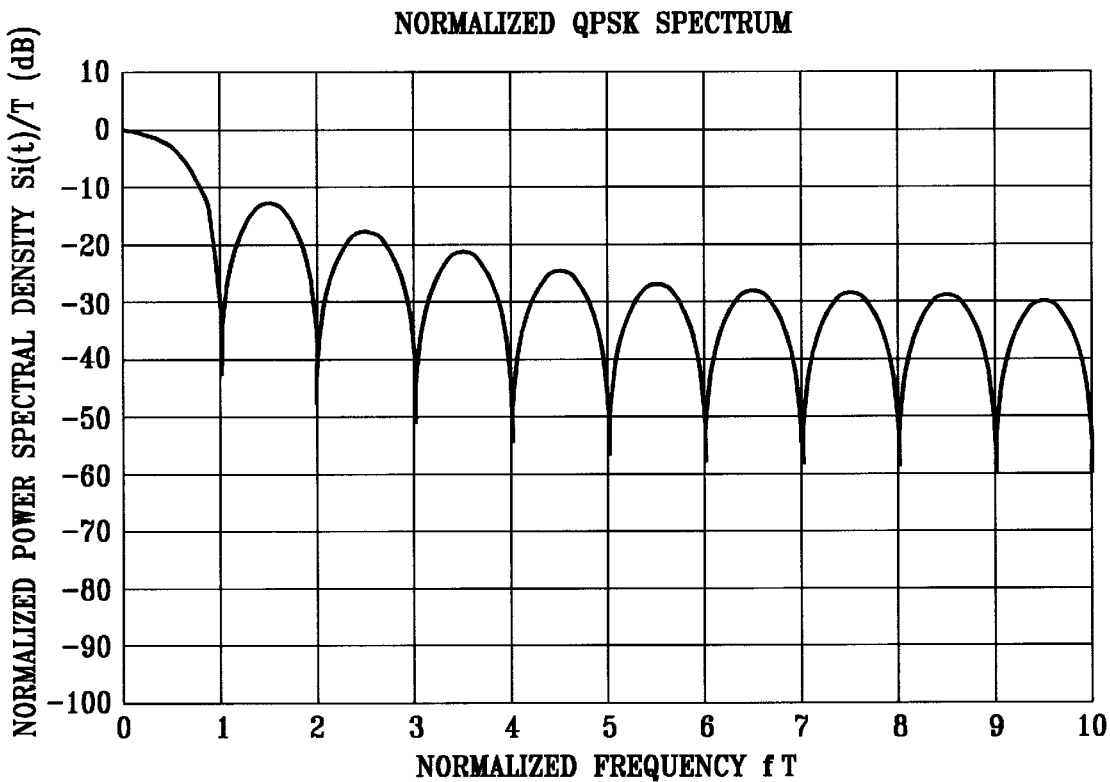
FIG. 9 is a chart illustrating a normalized QPSK spectrum.
Figure 10:
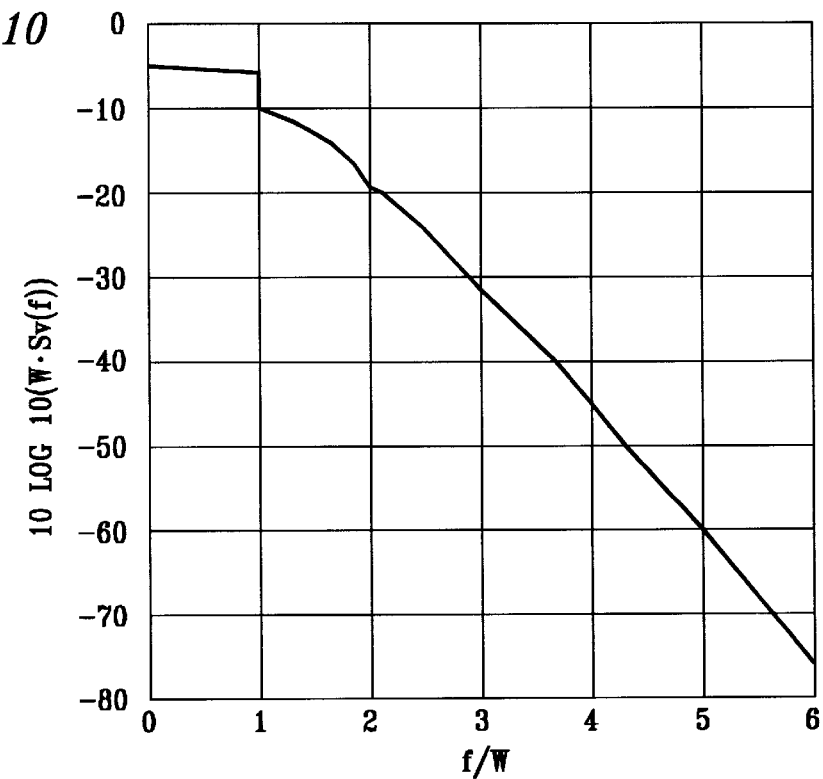
FIG. 10 is a chart illustrating a spectrum of an FM signal having a bandwidth of 30 kHz and an RMS mod index of 1.19.
Figure 11:
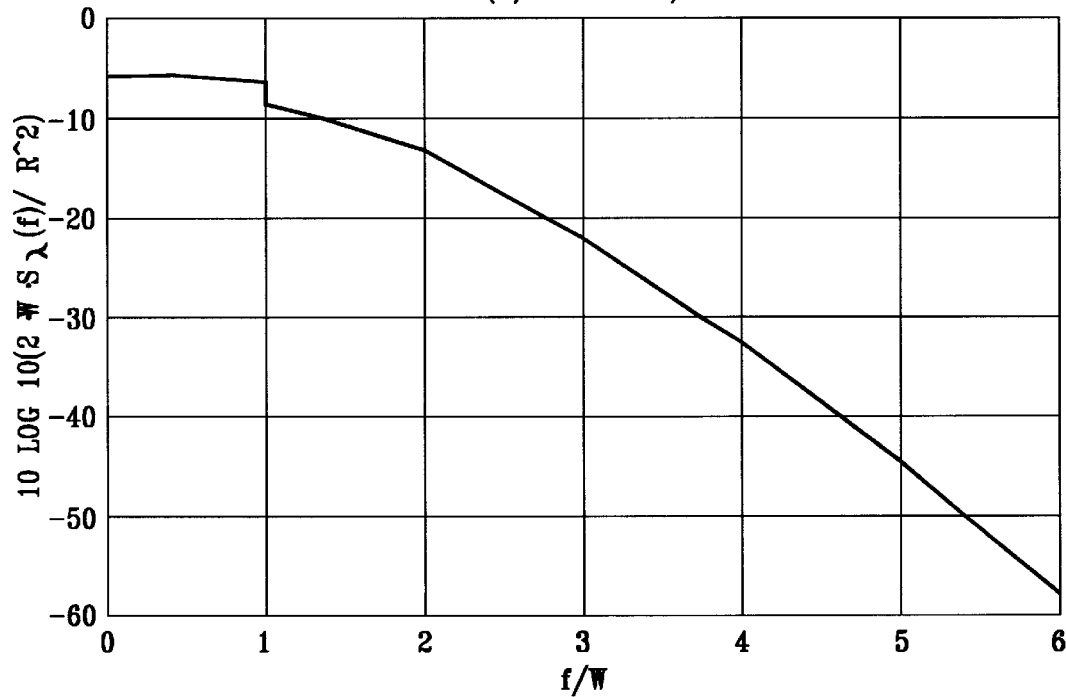
FIG. 11 is a chart illustrating an interference spectrum of two identical FM signals having an RMS mod index of 1.19 and B/2W=3.75.
Figure 12:
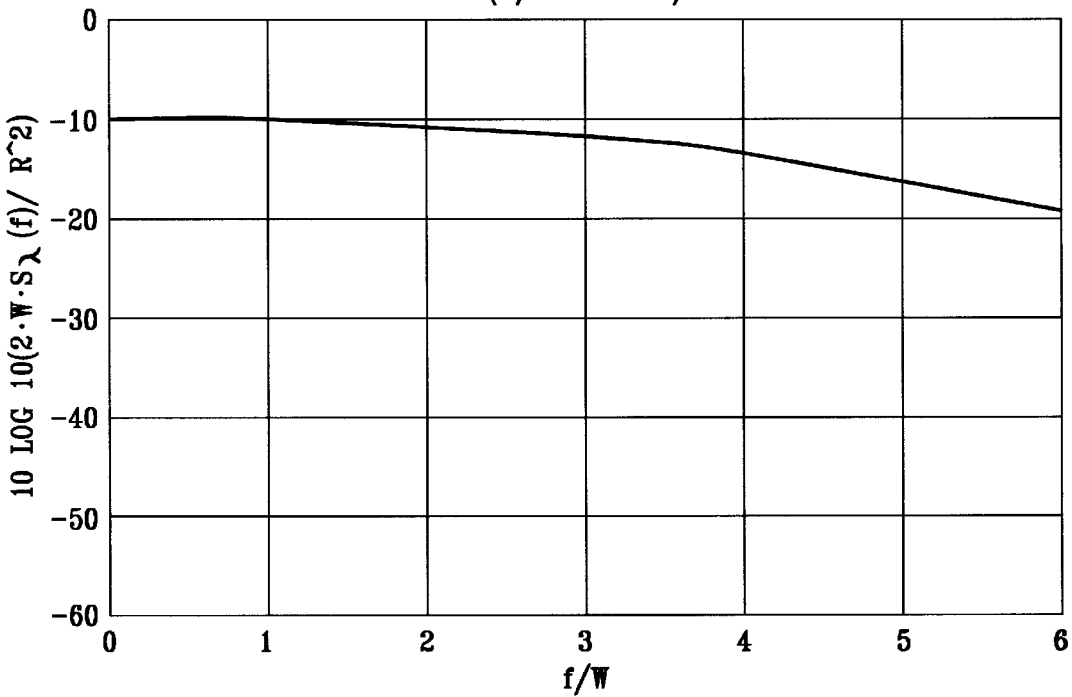
FIG. 12 is a chart illustrating an interference spectrum of an FM desired signal and an MSK interferer across a 30 kHz bandwidth.
Figure 13:
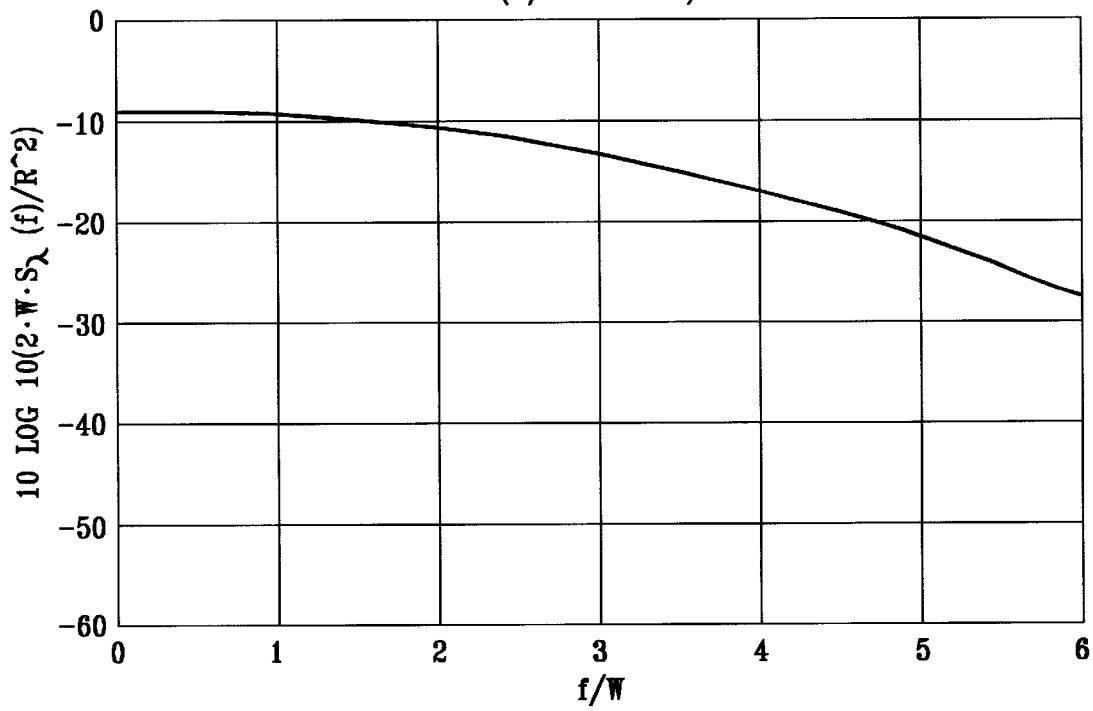
FIG. 13 is a chart illustrating an interference spectrum of an FM desired signal and an QPSK interferer across a 30 kHz bandwidth.
Figure 14:
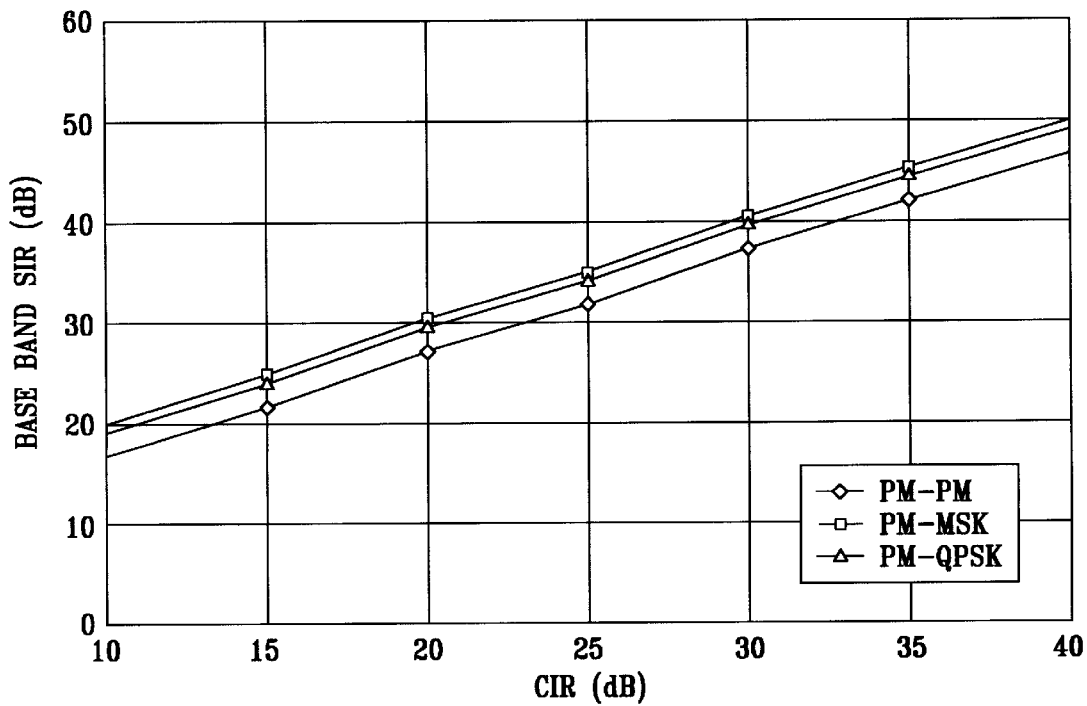
FIG. 14 is a chart summarizing FIGS. 11–13 without normalization.

Tables 2, 3 and 4 give the results for the ratio of signal to interference power density $SIR_{min}$ for $R^2$=0.01 (corresponding to CIR of 20 dB), when both signal and interference are non fading. The interference spectra are estimated with both desired signal and interferer occupying the same bandwidth. The bandwidth of the angle modulated signal is estimated using Carson's rule, while the bandwidth occupied by the digital signal is assumed to be 1.3/T. The minimum signal to interference power density when the systems under consideration occupy different bandwidths have been evaluated. The spectra of the MSK and QPSK modulated interferers for a bandwidth occupancy of 30 kHz are shown in FIGS. 8 and 9 respectively. The spectrum of the phase modulated signal with root mean square (RMS) modulation index of 1.19 (corresponding to 30 kHz bandwidth) is given in FIG. 10. The interference spectra for analog to analog and digital to analog are evaluated and given in FIGS. 11–13 when the desired signal as well as the interfering signal are occupying an equivalent bandwidth of 30 kHz. FIGS. 11–13 are summarized without normalization in FIG. 14. The $SIR_{min}$ offered on the phase modulated signal by MSK interference is seen to be better by about 3.3 dB and that offered by QPSK interference by about 2.5 dB compared to an equivalent analog phase modulated interference. The effect of increasing the modulation index on the base band SIR is observed from the tables. It is seen that if high CIR at RF is maintained, the base band SIR improves as the modulation index of the desired signal is increased. This can be used to advantage in improving the output SIR by trading bandwidth.

TABLE 2

PM—PM

| Bandwidth (KHz) | RMS Modulation Index $\Phi_s = \Phi_i$ | $\dfrac{\Phi_S^2/2W}{S_\lambda(0)/R^2}$ dB |
|---|---|---|
| 25 | 0.9 | 4.6 |
| 30 | 1.19 | 6.83 |
| 40 | 1.732 | 10.58 |

TABLE 3

PM—MSK

| MSK Interferer | | FM signal | SIR (min) |
|---|---|---|---|
| Bandwidth $\dfrac{1.3}{T}$ (KHz) | Baud Rate $\dfrac{1}{T}$ (Kilo baud) | RMS Modulation Index $\Phi_s$ | $\dfrac{\Phi_S^2/2W}{S_\lambda(0)/R^2}$ dB |
| 25 | 19.23 | 0.9 | 7.03 |
| 30 | 23.08 | 1.19 | 10.14 |
| 40 | 30.77 | 1.732 | 14.68 |

TABLE 4

PM—QPSK

| QSPK Interferer | | FM signal | SIR (min) |
|---|---|---|---|
| Bandwidth $\dfrac{1.3}{T}$ (KHz) | Baud Rate $\dfrac{1}{T}$ (Kilo baud) | RMS Modulation Index $\Phi_s$ | $\dfrac{\Phi_S^2/2W}{S_\lambda(0)/R^2}$ dB |
| 25 | 19.23 | 0.9 | 6.18 |
| 30 | 23.08 | 1.19 | 9.31 |
| 40 | 30.77 | 1.732 | 13.86 |

In light of the foregoing, it can be appreciated that the base band SIR in the case of an MSK interferer is better than an equivalent QPSK interferer, and that both of the digital interferers under consideration provide higher base band SIR than that provided by an equivalent analog phase modulated interferer.

By the use of the present invention, performance may be evaluated for co-existing digital and analog systems, such as, for example, mobile radio systems where analog AMPS and digital TDMA systems share the same band. Such evaluation permits the capacity and/or the quality of service of such systems to be optimized.

It is understood that the present invention can take many forms and embodiments. Accordingly, several variations may be made in the foregoing without departing from the spirit or the scope of the invention. For example, the method of the present invention may be employed to analyze the interference immunity offered by different modulation schemes and can be extended to estimate the effects of both ACI and CCI under fading and also the effect of diversity in combating interference in high capacity mobile radio systems.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A method for optimizing spectral re-use between an interferer digital phase modulated cellular system utilizing a first transmitter/receiver configurable to operate substantially at a first frequency, and a desirable analog phase modulated cellular system utilizing a second transmitter/receiver configurable to operate substantially at a second frequency, the first and second transmitter/receivers being separated by a re-use distance, the method comprising the steps of:

determining a carrier-to-interference ratio (CIR) with reference to the re-use distance;

setting an acceptable baseband signal-to-interference ratio (SIR);

determining an interference reduction factor (IRF) as the ratio of the SIR to the CIR;

determining an optimum frequency separation $f_d$ with reference to the power spectral density of the random phase angle, an interference-to-signal-carrier power ratio, and autocorrelation functions of the baseband phase modulated processes;

configuring the first transmitter to operate substantially at the first frequency; and configuring the second transmitter to operate substantially at the second frequency, wherein the second frequency is substantially separated in bandwidth from the first frequency by at least the determined frequency separation $f_d$.

2. The method of claim 1, wherein the step of determining an optimal frequency separation $f_d$ further comprises numerically determining an optimal frequency separation $f_d$ with reference to the equation given by:

$$S_\lambda(f) = \int_{-\infty}^{\infty} \frac{R^2}{2} \cos[2\pi f_d \tau] R_{v_i}(\tau) R_{v_s}(\tau) e^{-j2\pi f \tau} d\tau$$

as $f \to f_d$, wherein $S_\lambda(f)$ is the power spectral density of the random phase angle $\lambda$, R is the ratio of the amplitude of the interfering wave to the amplitude of the desired wave, $\tau$ is a time variable of integration, and $R_{v_i}$ and $R_{v_s}$ are autocorrelation functions of the baseband phase modulated processes; and wherein the IRF is determined with reference to the equation given by:

$$IRF = \frac{\Phi_s^2/2W}{S_\lambda(f_d)/R^2}$$

wherein $\Phi_s^2/2W$ is baseband power spectral density of the desired signal, $S_\lambda(f_d)$ is the value of the power spectral density of a random phase angle $\lambda$ at $f_d$.

3. The method of claim 1 wherein the step of setting an acceptable baseband SIR further comprises setting the SIR to about 50 dB.

4. A method for optimizing spectral re-use between an interferer digital phase modulated cellular system utilizing a first base station antenna operative substantially at a first frequency, and a desirable analog phase modulated cellular system utilizing a second base station antenna operative substantially at a second frequency, the first frequency and second frequency being substantially separated in bandwidth by a frequency separation of $f_d$, the method comprising the steps of:

determining the power spectral density of the random phase angle at the separation frequency $f_d$, with reference to the interference-to-signal carrier power ratio, the separation frequency $f_d$, and autocorrelation functions of the baseband phase modulated processes;

determining an interference reduction factor (IRF) with reference to the baseband power spectral density of the desired signal, the power spectral density of a random phase angle at $f_d$, and an interference carrier-to-signal carrier power ratio;

setting an acceptable baseband signal-to-interference ratio (SIR);

determining a carrier-to-interference ratio (CIR) as a ratio of the SIR to the IRF;

determining the re-use distance with reference to the CIR; and spacing apart the first base station antenna and the second base station antenna to obtain at least the determined re-use distance therebetween.

5. The method of claim 4 wherein the step of determining an IRF further comprises determining an IRF with reference to the equation given by:

$$IRF = \frac{\Phi_s^2/2W}{S_\lambda(f_d)/R^2}$$

wherein $\Phi_s^2/2W$ is baseband power spectral density of the desired signal, $S_\lambda(f_d)$ is the value of the power spectral density of a random phase angle $\lambda$ at $f_d$, and R is the ratio of the amplitude of the interfering wave to the amplitude of the desired wave.

6. The method of claim 4 wherein the step of determining an IRF further comprises determining an IRF with reference to the equation given by:

$$IRF = \frac{\Phi_s^2/2W}{S_\lambda(f_d)/R^2}$$

wherein $\Phi_s^2/2W$ is the baseband power spectral density of the desired signal, $S_\lambda(f_d)$ is the value of the power spectral density of a random phase angle $\lambda$ at $f_d$, and R is the ratio of the amplitude of the interfering wave to the amplitude of the desired wave, wherein $S_\lambda(f_d)$ is determined numerically with reference to the equation given by:

$$S_\lambda(f) = \int_{-\infty}^{\infty} \frac{R^2}{2} \cos[2\pi f_d \tau] R_{v_i}(\tau) R_{v_s}(\tau) e^{-j2\pi f \tau} d\tau$$

as $f \to f_d$, wherein $\lambda$ is a random phase angle of a desired wave, $f_d$ is the separation frequency, $\tau$ is a time variable by which the integral is integrated, and $R_{v_i}$ and $R_{v_s}$ are autocorrelation functions of the baseband phase modulated processes.

7. The method of claim 4 wherein the step of determining the optimal re-use distance further comprises determining the optimal re-use distance by determining the ratio of the SIR to the IRF to the power of negative $\gamma$, where $\gamma$ is the path loss exponent.

8. The method of claim 4 wherein the step of determining the optimal re-use distance further comprises determining the optimal re-use distance by determining the ratio of the SIR to the IRF to the power of negative $\gamma$, where $\gamma$ is the path loss exponent within a range of about 2 to about 6.

9. The method of claim 4 wherein the step of setting an acceptable baseband SIR further comprises setting the SIR to about 30 dB for co-channel interference (CCI).

10. The method of claim 4 wherein the frequency separation $f_d$ is set equal to zero for co-channel interference (CCI), and the step of determining the IRF further comprises determining the IRF with reference to the equation given by:

$$IRF = \frac{\Phi_s^2/2W}{S_\lambda(0)/R^2}$$

wherein $\Phi_s^2/2W$ is baseband power spectral density of the desired signal, $S_\lambda(0)$ is the power spectral density of a random phase angle $\lambda$ at zero, and R is the ratio of the amplitude of the interfering wave to the amplitude of the desired wave.

11. The method of claim 4 wherein the frequency separation $f_d$ is set equal to zero for co-channel interference (CCI), and the step of determining the IRF further comprises determining the IRF with reference to the equation given by:

$$IRF = \frac{\Phi_s^2/2W}{S_\lambda(0)/R^2}$$

wherein $\Phi_s^2/2W$ is baseband power spectral density of the desired signal, R is the ratio of the amplitude of the interfering wave to the amplitude of the desired wave, and $S_\lambda(0)$ is the power spectral density of a random phase angle $\lambda$ at zero, $S_\lambda(0)$ being determined with reference to the equation given by:

$$S_\lambda(f) = \frac{R^2}{2} \int_{-\infty}^{\infty} R_{v_i}(\tau) R_{v_s}(\tau) e^{-j2\pi f \tau} d\tau$$

as f→0, wherein τ is a time variable by which the integral is integrated, and $R_{v_i}(\tau)$ and $R_{v_s}(\tau)$ are autocorrelation functions of baseband phase modulated processes.

12. The method of claim 4 wherein the frequency separation $f_d$ is set equal to zero for co-channel interference (CCI), and the step of determining the IRF further comprises determining the IRF with reference to the equation given by:

$$IRF = \frac{\Phi_s^2/2W}{S_\lambda(0)/R^2}$$

wherein $\Phi_s^2/2W$ is baseband power spectral density of the desired signal, R is the ratio of the amplitude of the interfering wave to the amplitude of the desired wave, and $S_\lambda(0)$ is the power spectral density of a random phase angle λ at zero, $S_\lambda(0)$ being determined with reference to the equation given by:

$$S_\lambda(f) = \frac{R^2}{2} [S_{v_i}(f) \otimes S_{v_s}(f)]$$

as f→0, wherein $S_{v_i}(f)$ and $S_{v_s}(f)$ are spectral densities of baseband processes, and $\otimes$ denotes the convolution operation.

* * * * *

UNITED STATES PATENT AND TRADEMARK OFFICE
CERTIFICATE OF CORRECTION

PATENT NO. : 6,085,094
DATED : July 4, 2000
INVENTOR(S) : Vasudevan et al.

It is certified that error appears in the above-identified patent and that said Letters Patent is hereby corrected as shown below:

Column 4,
Line 67, delete "For MSK: 30 dB-10.14 dB 19.86 dB" insert -- For MSK:30 dB-10.14 dB=19.86 dB --

Column 7,
Line 60,

Delete " $Re[(e^{j\Phi_s(t)} + Re^{j(2\pi f_d t + \Phi_i(t) + \mu)})e^{j2\pi f_c t}] = Re[e^{j\Phi_s(t)}(1 + Re^{j(2\pi f_d t + \Phi_i(t) - \Phi_s(t) + \mu)})e^{j2\pi f_c t}]$ "

Insert -- $Re[(e^{j\Phi_s(t)} + Re^{j(2\pi f_d t + \Phi_i(t) + \mu)})e^{j2\pi f_c t}] = Re[e^{j\Phi_s(t)}(1 + Re^{j(2\pi f_d t + \Phi_i(t) - \Phi_s(t) + \mu)})e^{j2\pi f_c t}]$ --

Line 67,

Delete " $Im[\ln(s(t) + i(t))] = \Phi_s(t) + Im[\ln(1 + Re^{j(2\pi f_d t + \Phi_i(t) - \Phi_s(t) + \mu)})]$ "

Insert -- $Im[\ln(s(t) + i(t))] = \Phi_s(t) + Im[\ln(1 + Re^{j(2\pi f_d t + \Phi_i(t) - \Phi_s(t) + \mu)})]$ --

Column 9,
Line 38,

Delete " $\int_{-\infty}^{+\infty} e^{-jk[\Phi_i(t) - \Phi_i(t+\tau)]} e^{jk[\Phi_s(t) - \Phi_s(t+\tau)]} e^{-jk2\pi f_d \tau} e^{-j2\pi f \tau} d\tau$ "

Insert -- $\int_{-\infty}^{+\infty} e^{-jk[\Phi_i(t) - \Phi_i(t+\tau)]} e^{jk[\Phi_s(t) - \Phi_s(t+\tau)]} e^{-jk2\pi f_d \tau} e^{-j2\pi f \tau} d\tau$ --

Line 38,

Delete " $f_\theta(\theta) = \begin{cases} \dfrac{1}{2\pi} & 0 \leq \theta \leq 2\pi \\ 0 & otherwise \end{cases}$ "

Insert -- $f_\theta(\theta) = \begin{cases} \dfrac{1}{2\pi} & 0 \leq \theta \leq 2\pi \\ 0 & otherwise \end{cases}$ --

Page 1 of 3

UNITED STATES PATENT AND TRADEMARK OFFICE
CERTIFICATE OF CORRECTION

PATENT NO. : 6,085,094
DATED : July 4, 2000
INVENTOR(S) : Vasudevan et al.

Page 2 of 3

It is certified that error appears in the above-identified patent and that said Letters Patent is hereby corrected as shown below:

Column 10,
Line 3,

Delete " $R_{v_s}(\tau) = e^{-k_p^{\,2}(R_m(0)-R_m(\tau))}$ "

Insert -- $R_{v_s}(\tau) = e^{-k_p^2(R_m(0)-R_m(\tau))}$ --

Line 33,

Delete " $R_{v_s}(\tau) = e^{-k_p^{\,2}R_m(0)} e^{k_p^{\,2}R_m(\tau)} \cong e^{-k_p^{\,2}R_m(0)}\left[1 + k_p^{\,2} R_m(\tau)\right]$ "

Insert -- $R_{v_s}(\tau) = e^{-k_p^2 R_m(0)} e^{k_p^2 R_m(\tau)} \cong e^{-k_p^2 R_m(0)}\left[1 + k_p^2 R_m(\tau)\right]$ --

Line 57,

Delete " $k_p^{\,2n} R_m^{\,n}(\tau)$ " and insert -- $k_p^{2n} R_m^n(\tau)$ --

Line 58,

Delete " $k_p^{\,2} R_m(\tau)$ " and insert -- $k_p^2 R_m(\tau)$ --

UNITED STATES PATENT AND TRADEMARK OFFICE
CERTIFICATE OF CORRECTION

PATENT NO.   : 6,085,094
DATED        : July 4, 2000
INVENTOR(S)  : Vasudevan et al.

It is certified that error appears in the above-identified patent and that said Letters Patent is hereby corrected as shown below:

Column 11,
Line 8, delete "$\Phi_s$ index" and insert -- index $\Phi_s$ --

Column 12,
Line 25, delete " $R^2 < 1$ " and insert -- $R^2 << 1$ --

Signed and Sealed this

Fifth Day of March, 2002

*Attest:*

JAMES E. ROGAN
*Attesting Officer*    *Director of the United States Patent and Trademark Office*